United States Patent

Chu

Patent Number: 5,550,780
Date of Patent: Aug. 27, 1996

[54] TWO CYCLE ASYNCHRONOUS FIFO QUEUE

[75] Inventor: Tam-Anh Chu, Milpitas, Calif.

[73] Assignee: Cirrus Logic, Inc., Fremont, Calif.

[21] Appl. No.: 359,298

[22] Filed: Dec. 19, 1994

[51] Int. Cl.$^6$ ............................................. G11C 7/00
[52] U.S. Cl. .................... 365/221; 365/73; 365/78; 365/187.05; 365/239
[58] Field of Search ..................... 365/189.05, 221, 365/230.08, 239, 240, 78, 73; 377/77

[56] References Cited

U.S. PATENT DOCUMENTS

| | | |
|---|---|---|
| 3,166,715 | 1/1965 | Cogar . |
| 3,212,009 | 10/1965 | Parker . |
| 3,300,724 | 1/1967 | Cutaia . |
| 3,378,776 | 4/1968 | Goldberg et al. . |
| 3,460,098 | 8/1969 | De Blauw . |
| 3,510,680 | 5/1970 | Cogar . |
| 3,727,204 | 4/1973 | de Koe . |
| 3,757,231 | 9/1973 | Faustini . |
| 3,838,345 | 9/1974 | Schneider . |
| 3,953,838 | 4/1976 | Gilberg et al. . |
| 4,058,773 | 11/1977 | Clark et al. . |
| 4,156,288 | 5/1979 | Spandorfer . |
| 4,679,213 | 7/1987 | Sutherland . |
| 4,837,740 | 6/1989 | Sutherland . |
| 5,036,489 | 7/1991 | Theobald .......................... 365/221 X |
| 5,157,633 | 10/1992 | Aoki ..................................... 365/221 |
| 5,179,688 | 1/1993 | Brown et al. ....................... 365/221 X |

OTHER PUBLICATIONS

"Micropipelines" by Ivan E. Sutherland, Communications of the ACM, vol. 32, No. 6, Jun. 1989, pp. 720–738.
Introduction to VLSI Systems by Carver Mead et al., "System Timing" by Charles Seitz, Chapter 7, pp. 258–261, Addison-Wesley Publishing Company, 1980.
"Modeling Timing Assumptions with Trace Theory" by Jerry R. Burch, 1989 IEEE, pp. 208–211.
"On the Models for Designing VLSI Asynchronous Digital Systems" by Tam–Anh Chu, Integration, The VlSI Journal 4 (1986), pp. 99–113.

Primary Examiner—David C. Nelms
Assistant Examiner—Son Dinh
Attorney, Agent, or Firm—Lowe, Price, LeBlanc & Becker

[57] ABSTRACT

A two-cycle asynchronous first-in/first-out (FIFO) device has a plurality of queue registers for holding data, and control cells coupled to the queue registers for controlling data transfer into and out of the registers. Each control cell includes interconnected first and second latches. The first latch receives a request-in signal from a previous control cell and in response produces an intermediate signal. The second latch receives the intermediate signal and in response supplies a request-out signal to a subsequent control cell. The control cell also has a logic circuit coupled to the queue register and first and second latches. In response to input signals, the logic circuit produces load and hold control signals to the queue register and first and second latches. The device includes two-to-four and four-to-two cycle converters that allow the two-cycle FIFO device to be used in either a two-cycle or a four-cycle environment.

36 Claims, 6 Drawing Sheets

FIG. 2          Prior Art
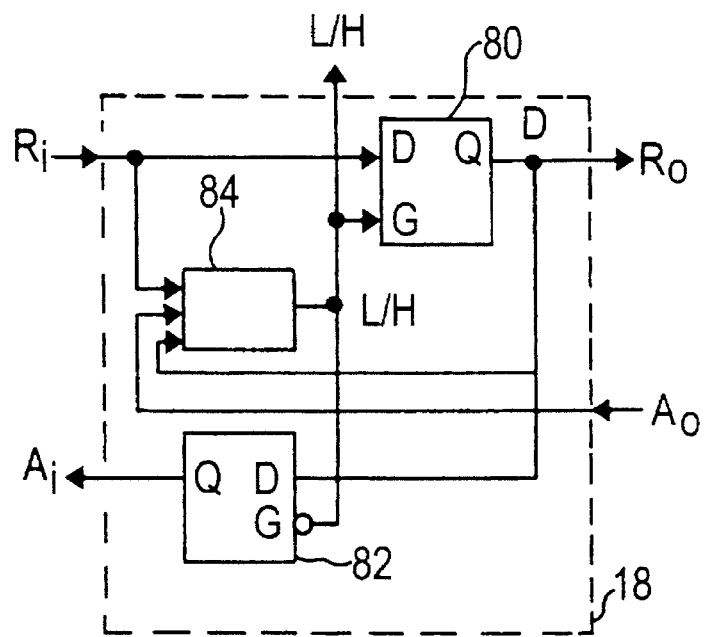
FIG. 2a         Prior Art
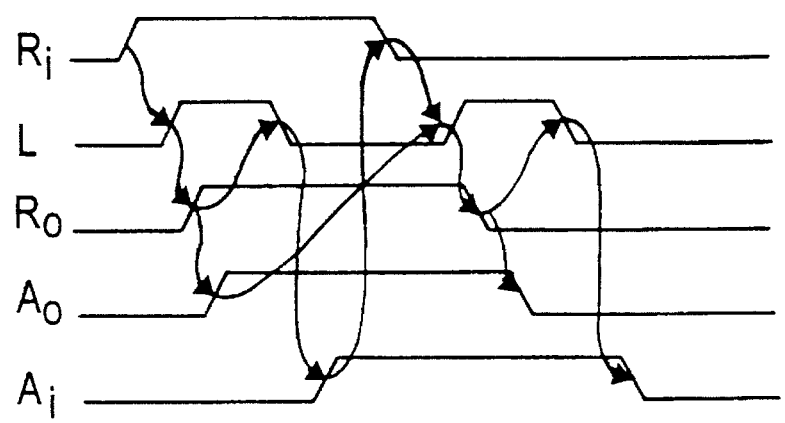

TWO CYCLE ASYNCHRONOUS FIFO QUEUE

TECHNICAL FIELD OF THE INVENTION

The present invention relates to the transfer of data between devices, and more particularly, to asynchronous first-in/first-out (FIFO) queues used in the computing field to provide large data transfers between devices that operate at different rates, and in which data signals are transferred inside the FIFO without regard to system clocks.

DESCRIPTION OF RELATED ART

In computing equipment, electronic digital first-in/first-out storage systems serve as a buffer between two devices, allowing the devices to function independently. A FIFO stores output from one processor until a subsequent processor is ready for it, providing time independence between the two processors. The first-in/first-out nature of FIFO storage systems ensures that the subsequent processor receives the data elements in the same order that they were generated, though not necessarily on the same time schedule as they were received from the previous processor. In other words, a FIFO permits each of the processors to deliver or obtain data at a rate convenient to it, without regard to the instantaneous speed or timing of the other processor. Thus, a FIFO couples two processors with regard to work flow, but decouples their timing. A FIFO is therefore often used for graphic and disk drive controllers.

While synchronous FIFOs are suitable for coupling processors that share a common clock, other systems demand asynchronous operation, such as application specific integrated circuits (ASIC) that have a plurality of devices with different clocks. For such applications, an asynchronous FIFO is needed. Using such a FIFO, processors with a common clock or processors that operate independently with respect to time can be coupled together.

Generally, in an asynchronous sequential FIFO, data elements enter an input port and move sequentially and asynchronously through an array of data cells to an output port from which they emerge in the same order as they entered. Each data element moves forward through the FIFO as far and as fast as it can, with due regard to avoiding destruction of the data element ahead of it in the sequence. An asynchronous sequential FIFO is distinguished from a synchronous sequential FIFO by the fact that different data elements move at different times, and not in synchronism with a common clock. The control element for each data cell in an asynchronous sequential FIFO need consider only the state of its predecessor and successor cells and does not need to consider other conditions.

An example of a prior art asynchronous FIFO with four stages is shown in block diagram form in FIG. 1, and a timing diagram showing the relationship between the control signals and the data flow is shown in FIG. 1a. The asynchronous FIFO 14 provides communication to allow a large amount of data transfer between two devices 10, 12 that have different clocks. In the illustrated arrangement, the asynchronous FIFO 14 is a two-cycle FIFO in which data moves through the FIFO 14 upon every transition of the control signal, and not just on rising (or falling) edges.

The FIFO 14 has a plurality of queue registers 20 sequentially connected to one another, each queue register 20 having a plurality of data (or 'register') cells $16_1$–$16_N$. The number of data cells in each queue register 20 represents the width of the data. Commonly, the width of the data is 8, 16 or 32 bits. Data that is N bits wide enters the FIFO 14 from the first device 10 through an entry port and is shifted into and out of the individual queue registers 20, from register to register, until the data is provided at the output port to the second device 12.

The data moves through the register cells $16_1$–$16_N$ under control of a separate control mechanism, such as the control cell 18 shown in FIG. 1. The control cell 18 controls data flow into and out of the queue register 20 through a load signal (L) and a hold signal (H). The load signal L causes the latches forming the register cells $16_1$–$16_N$ to load the data, and the subsequent hold signal H causes the latches to hold their outputs at the levels of the loaded data, where it is then available for transfer to the next queue register.

As illustrated, one or more control wires, generally two, are placed in parallel with the data wires. The control wires carry signals indicating whether data can move into the next successive data location (i.e. the next queue register 20), and whether it actually has moved. A sequence of identical control cells 18 is generally provided, one cell for each queue register 20, that control the actions of the register cells 16 of the queue registers 20. The control cell 18 receives a request-in signal (Ri) from the previous control cell when the data in the previous queue register is available for moving into the queue register 20 coupled to the control cell 18. The acknowledge-in signal (Ai) indicates to the previous control cell that the data has actually moved into the queue register 20. The request-out signal (Ro) forms the request-in signal Ri to the next control cell and is asserted when the data in the queue register 20 is available for transfer to the next queue register. The acknowledge-out signal (Ao) is the acknowledge-in signal Ai sent from the subsequent control cell and acknowledges that the data has actually moved into its corresponding queue register.

In operation, as shown in the timing diagram of FIG. 1a, when data Di is available from the previous queue register, the previous control cell changes the level of the request-in signal Ri, in the first instance from a low to a high level. The queue register 20 loads and holds the data which is now available as output data Do. The control cell 18 sends a request-out signal Ro to the next control cell to indicate that it has data available for transfer. It also sends an acknowledge-in signal Ai to the previous control cell to indicate that the data has actually moved into the queue register 20. The control cell receives an acknowledge-out signal Ao from the subsequent control cell when the data in the queue register 20 moves into the subsequent queue register. At this point, when there is more data available and ready to enter the queue register 20, the request-in signal Ri transitions to a low level, and the same sequence of events occurs, except with transitions from high to low levels.

The above process describes a two-cycle control. Although two-cycle control is extremely fast, due to the moving of data upon every transition of the request/acknowledge signals, many devices operate with four-cycle control in which: (1) data input is presented; (2) the request signal level is raised; (3) the request signal level is lowered; and (4) new data is presented. Two-cycle asynchronous FIFOs of the prior art are incompatible with such four-cycle devices, and are therefore limited in their application with other devices.

An embodiment of a control cell 18 is described in the article, "On the models for designing VLSI asynchronous digital systems", T. A. Chu, *INTEGRATION, the VLSI journal* 4 (1986) pp. 99–113, by the inventor of the present invention and is shown in block diagram form in FIG. 2. The timing diagram for this control cell 18 is provided in FIG. 2a. The control cell 18 has first and second latches 80, 82 and a logic circuit 84 that provides the load signal L1 and the hold signal H1 in response to logical combinations of input signals. The newly raised signal D1 forms the input (Ro) to the control cell of the next stage of the FIFO. (This control cell is constructed identically to the illustrated control cell and is therefore not shown. The signals within this next control cell will be designated with a "2" to distinguish from the signals in the first control cell.) The Ro signal causes the load (L2) signal of the next stage control cell to become a 1. This then causes the D2 in the next stage control cell to become a 1, causing L2 in the next stage control cell to become a 0.

Let $t_{L1L2}$ indicate the time from L1 rising until the load signal L2 becomes 1 and back to 0 again. Let $t_{L1D1}$ indicate time from L1 rising until the data D1 is ready at the output of the data latch of stage 1. If the data is delayed such that $t_{L1D1} > t_{L1L2}$, then the data latch in the next stage can miss loading the input data, because the load signal L2 is turned off before the data is available. Even if $t_{L1D1} < t_{L1L2}$, there is a chance that the data will arrive at the data latch with not enough setup time to guarantee that data is reliably loaded into the data latch.

The above scenario may or may not happen between two consecutive stages even if the above timing violation exists. However, the skew between data and the load signal becomes larger further down the length of the FIFO. After a number of stages (depending on the delay difference between the control and the data latches), the skew between data and control will become large enough to cause such a malfunction.

SUMMARY OF THE INVENTION

There is a need for a two-cycle asynchronous FIFO which can be used in both a two-cycle and a four-cycle environment, and which uses control cells that accurately control the transfer of data between the queue registers.

These and other needs are met by the present invention which provides an asynchronous queue arrangement comprising a plurality of queue registers for holding data and which are coupled in a series with one another, and a plurality of control cells coupled in series with one another. Each control cell is also coupled to a different one of the queue registers and controls data transfer into and out of the queue register. A four-to-two cycle converter is coupled to a first of the series of control cells, and a two-to-four cycle converter is coupled to a last of the series of control cells.

The converters used in the present invention provide the advantage of allowing the FIFO queue to be used in either a two-cycle or a four-cycle environment.

The earlier stated needs are also met by an embodiment of the invention which provides an asynchronous first-in/first-out (FIFO) device comprising a queue register for holding data and a control cell coupled to the queue register for controlling data transfer into and out of the queue register. The control cell includes first and second latches coupled with one another, the first latch receiving a request-in signal and in response producing an intermediate signal, the second latch receiving the intermediate signal and in response producing a request-out signal. The control cell also has a logic circuit coupled to the queue register and to the first and second latches. This logic circuit produces in response to input signals a load signal and a hold signal to the queue register and to the first and second latches, the load signal causing the queue register to load data and the hold signal causing the queue register to hold said data.

This embodiment of the present invention uses a control cell that accurately controls the transfer of data between queue registers and avoids the problem of the prior art cell by ensuring that the load signal is turned off, and data is loaded before issuing a request signal to the next FIFO stage. For latches with approximately equal delay, the present invention works well in any standard cell layout approach.

In certain preferred embodiments of the invention, the queue register includes a plurality of latches, and the first and second latches are identical to each other and to the plurality of latches of the queue register. This identical construction of the latches used in the control cell and in the queue register provides a simple, easily replicable design.

The present invention provides a four-to-two cycle converter for converting four-cycle request-write signals to a first-in/first-out (FIFO) register to two-cycle request signals and for converting two-cycle acknowledge signals from the FIFO register to four-cycle acknowledge-write signals. This converter comprises a first latch receiving the acknowledge signal, a second latch coupled to the first latch and receiving the request-write signal and in response producing the request signal, and a gate coupled to the first latch and receiving an output of the first latch and the acknowledge signal, the gate in response producing the acknowledge-write signal.

Also provided by the present invention is a two-to-four cycle converter for converting four-cycle acknowledge-read signals to a first-in/first-out (FIFO) register to two-cycle acknowledge signals and for converting two-cycle request signals from the FIFO register to four-cycle request-read signals. This two-to-four cycle converter comprises a first latch receiving the request signal, a second latch coupled to the first latch and receiving the acknowledge-read signal and in response producing the acknowledge signal, and a gate coupled to the first latch and receiving an output of the first latch and the request signal, the gate in response producing the request-read signal.

The two converters described above allow a two-cycle asynchronous FIFO to be used in both two-cycle and four-cycle environments, yet are configured in an elegant manner with only two latches and a gate.

The foregoing and other objects, features, aspects and advantages of the present invention will become more apparent from the following detailed description of the present invention when taken in conjunction with the accompanying drawings.

BRIEF DESCRIPTION OF DRAWINGS

FIG. 2 is a logic diagram of a prior art control cell for use with a FIFO.

FIG. 2a is a timing diagram of the signals of the control cell of FIG. 2.

DETAILED DESCRIPTION OF THE ILLUSTRATIVE EMBODIMENTS

Figure 1:
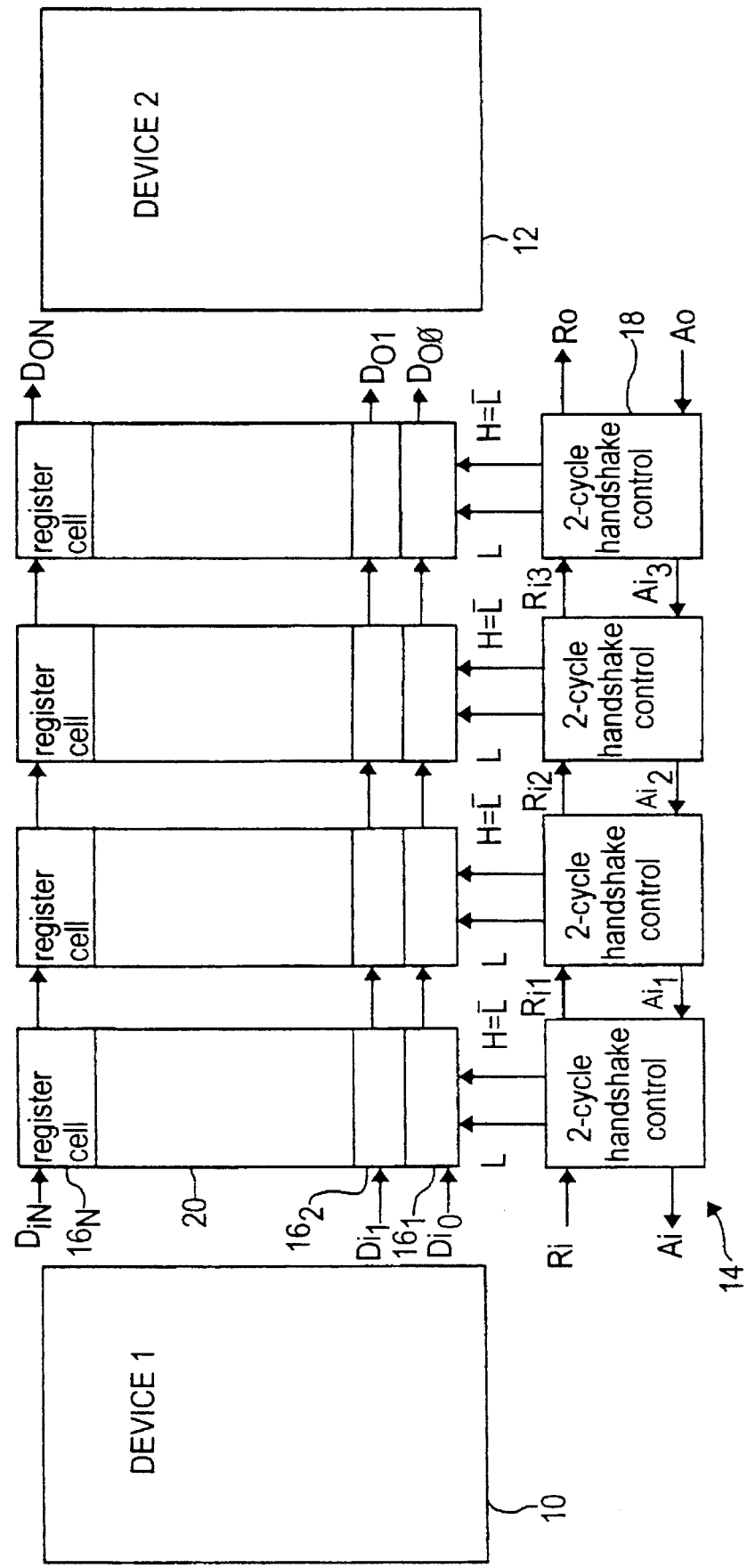
FIG. 1 shows in block diagram form a register stage of a two-cycle asynchronous FIFO queue according to the prior art.
Figure 1A:
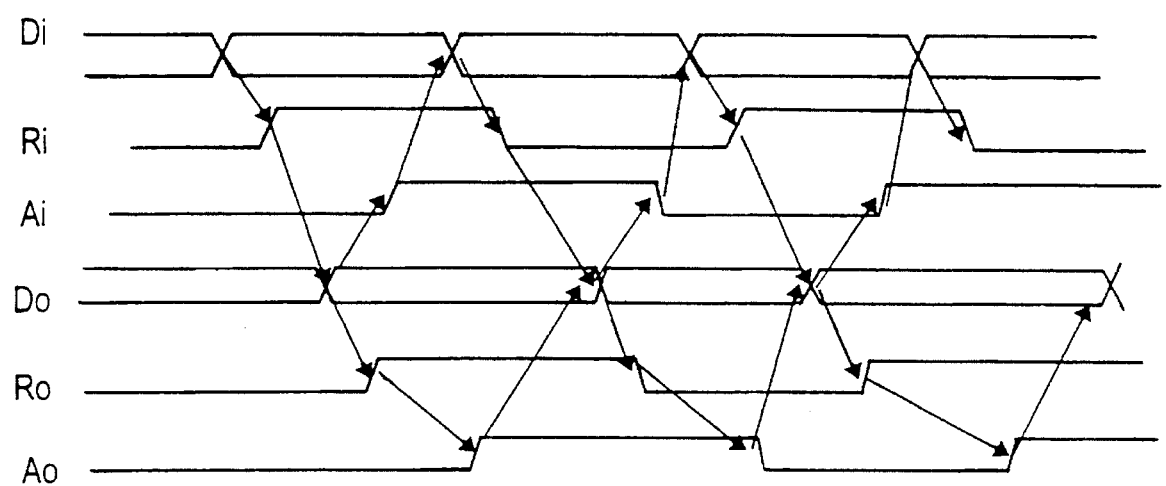
FIG. 1a is a timing diagram of the two-cycle asynchronous FIFO of the prior art.
Figure 3:
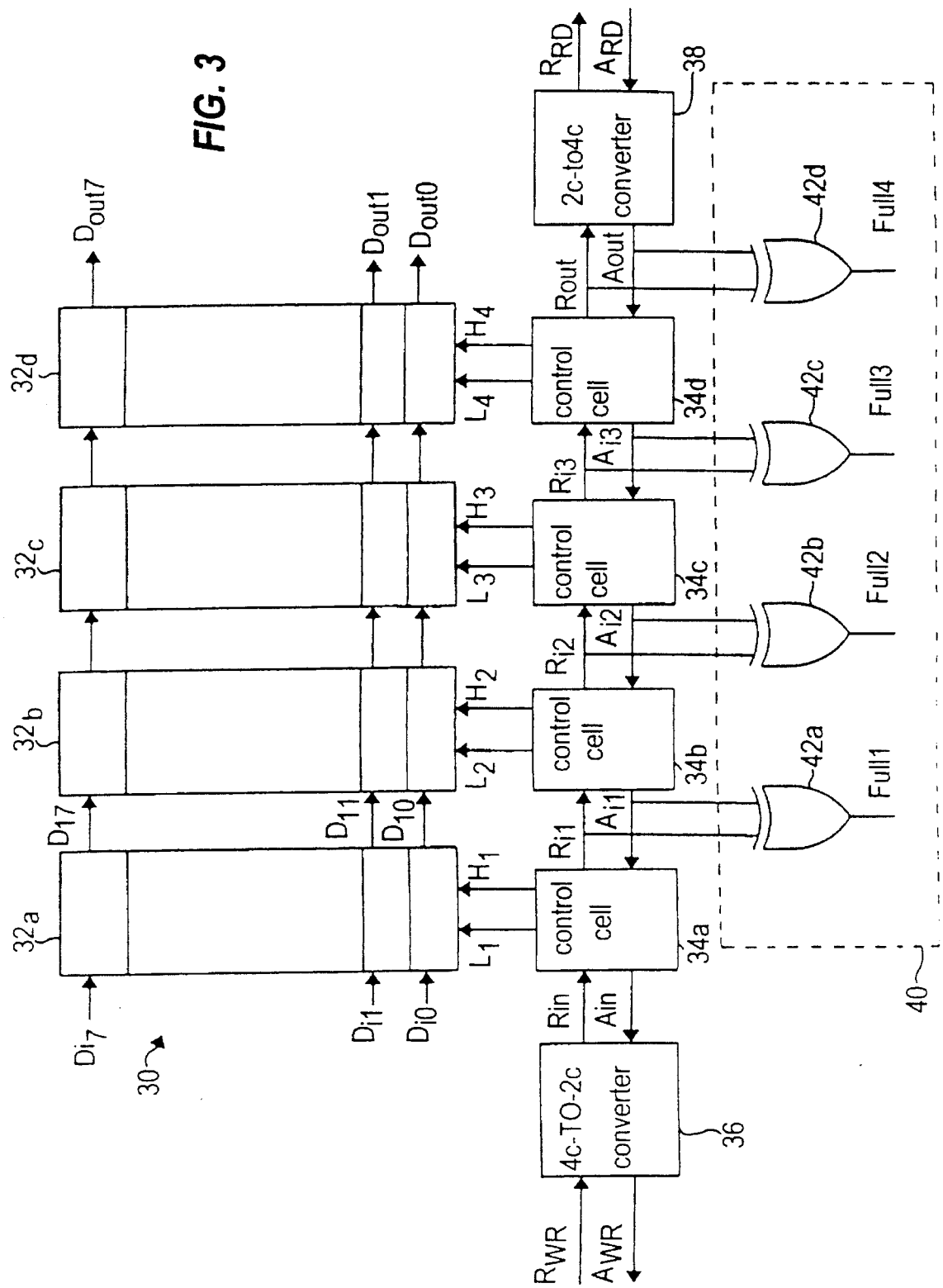
FIG. 3 is a block diagram of a FIFO queue constructed in accordance with an embodiment of the present invention.

An exemplary embodiment of a two-cycle asynchronous FIFO queue is illustrated in FIG. 3 and has the overall reference numeral 30. The FIFO queue 30 has a plurality of queue registers 32a–32d. In the illustrative embodiment, there are four queue registers 32a–32d that are each eight deep so as to hold eight bits of data $D_{i0}$–$D_{i7}$. This forms a 4×8 queue register 30. Other embodiments of the present invention provide different numbers and sizes of queue registers, as required by the application.

Each of the queue registers 32a–32d is coupled to a separate control cell 34a–34d. The control cells 34a–34d control the loading of the data $D_{i0}$–$D_{i7}$ appearing at the inputs of the queue registers 32a–32d as well as the holding of this data by the queue registers 32a–32d. The control cells 34a–34d accomplish this loading and holding through the use of control signals, such as load signals $L_1$–$L_4$ and hold signals $H_1$–$H_4$.

The FIFO queue 30 of FIG. 3 communicates with four-cycle devices through a four-to-two cycle converter 36 and a two-to-four-cycle converter 38. These converters 36, 38 are used to convert the normal four-cycle signals found in many digital signal processing applications to the two-cycle format used by the FIFO queue 30 of the present invention. An exemplary embodiment of these converters will be described in more detail later with respect to FIGS. 6 and 7. If the FIFO queue 30 is to be used in a two-cycle environment, the converters 36, 38 are unnecessary and are not provided.

A queue full indicator circuit 40 is provided in the exemplary embodiment to indicate when an individual queue register 32a–32d is full. The indicator 40 includes a plurality of logic gates 42a–42d, that are coupled to an input and an output of a control cell 34a–34d associated with one of the queue registers 32a–32d. In the illustrative embodiment, the logic gates 42a–42d are exclusive-OR gates.

In operation, when a device desires to write data to the FIFO queue 30, it provides the data $D_{i0}$–$D_{i7}$ to the inputs of the first queue register 32a. The device will also provide a request-write signal $(R)_{WR}$ to the four-to-two cycle converter 36. The request-write signal, which is a four-cycle signal, is converted into a two-cycle signal at the converter 36 and then provided as a request-in signal Ri to the first control cell 34a.

Upon receiving the request-in signal Ri, the control cell 34a, in a manner described in more detail later with respect to FIG. 4, produces a load signal $L_1$ to the first queue register 32a. This load signal $L_1$ causes a loading of the data $D_{i0}$–$D_{i7}$ into the individual latches (register cells) of the queue register 32a. The control cell 34a then acknowledges the reading-in of the data $D_{i0}$–$D_{i7}$ by sending a two-cycle acknowledge-in signal (Ai) to the four-to-cycle converter 36, which converts this two-cycle signal to a four-cycle acknowledge-write $(A_{WR})$ signal.

The control cell 34a supplies a hold signal $(H_1)$ to the first queue register 32a which causes the data $D_{i0}$–$D_{i7}$ to be held in the individual latches of the first queue register 32a. The control cell 34a also produces as an output a request-in signal $(Ri_1)$ which is received by a second control cell 34b. This request-in signal $(Ri_2)$ indicates that data is available for transfer from the first queue register 32a to the second queue register 32b as data $D_{10}$–$D_{17}$. Since the request-in signal $Ri_1$ is a logical high, indicating that data is available in the first queue register 32a, and the return signal acknowledge-in $(Ai_1)$ is still a logical low as the second control cell 34b has not yet acknowledged the request-in signal $Ri_1$ the exclusive-OR gate 42a provides at its output a logical high signal indicating that the first queue register 32a is full.

In the above manner, data in the first queue register 32a is transferred to the second queue register 32b and so on to the registers 32c, 32d and eventually out of the last queue register 32d and the FIFO queue 30.

When the data is to be provided as an output $D_{out0}$–$D_{out7}$ $D_{out7}$ from the last queue register 32d, the last control cell 34d provides a two-cycle request-out signal Ro to the two-to-four cycle converter 38, which produces a four-cycle request read $(R_{RD})$ signal to another device indicating that the data is ready to be read. The device acknowledges the reading of the data $D_{out0}$–$D_{out7}$ with an acknowledgement-read signal $(A_{RD})$ that is converted to a two-cycle acknowledge-out signal (Ao) received by the last control cell 34d.

The FIFO queue 30 is a two-cycle queue since data is shifted between the queue registers 32a–32d upon each transition of the request-in signal Ri. In other words, the data is shifted between the registers 32a–32d when there is a low-to-high transition of the request-in signal as well as when there is a high-to-low transition of the request-in signal.

Figure 4:
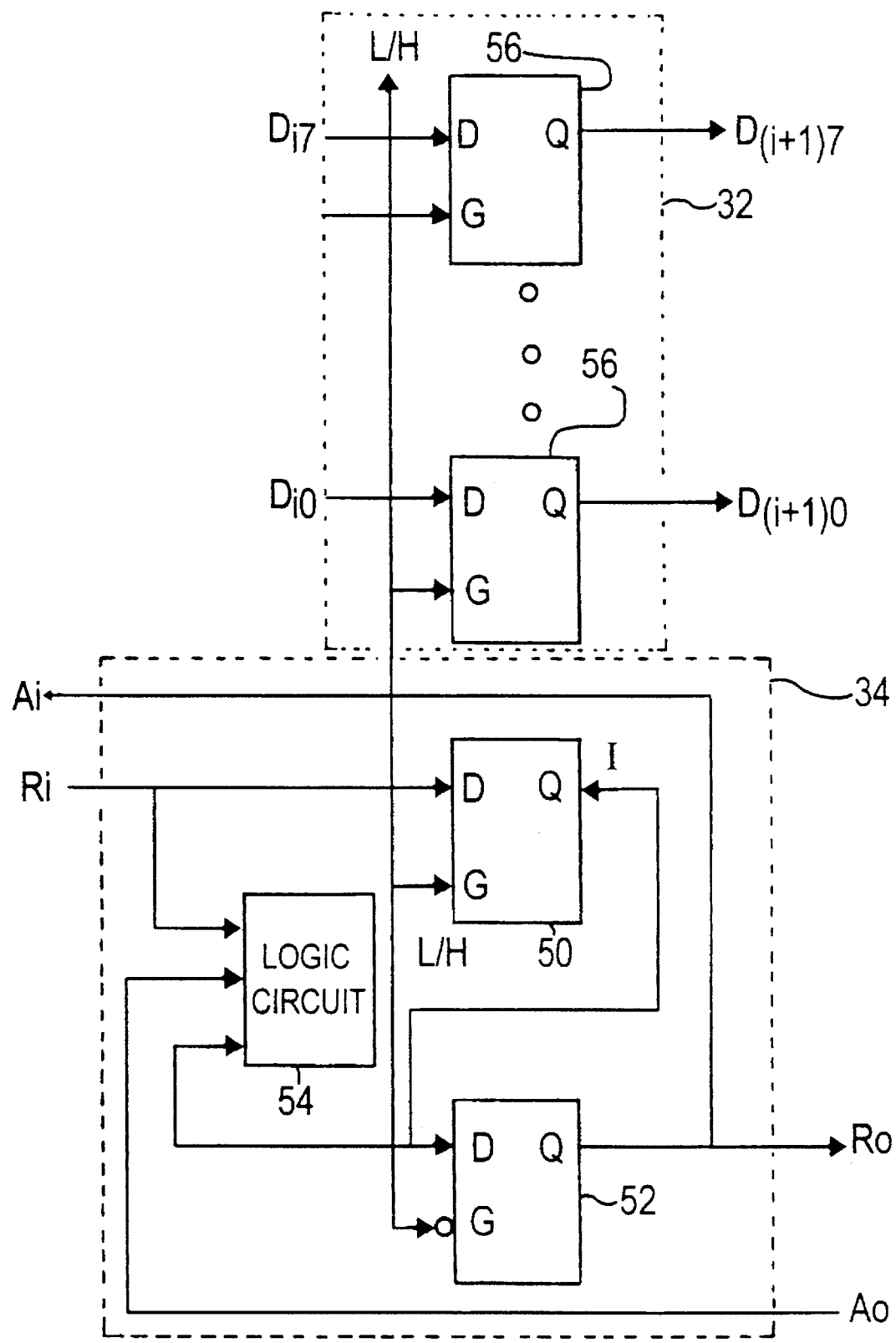
FIG. 4 depicts a control cell constructed in accordance with an embodiment of the present invention used in the FIFO queue of FIG. 3.

FIG. 4 illustrates an exemplary embodiment of one of the control cells 34 of the present invention in block diagram form. The latch (register cell) 32 is also illustrated in more detail in block diagram form. In preferred embodiments, the control cells 34a–34d are identical in construction.

The control cell 34 includes a first latch 50, a second latch 52, and a logic circuit 54. The first latch 50 receives at a data input the request-in signal Ri from the output of another control cell 34, or from the output of the four-to-two cycle converter 36 if it is the first control cell 34a. This request-in signal Ri indicates that the data $D_{i0}$–$D_{i7}$ is available for input into the queue register 32.

The first latch 50 also has a control input (or "gate input") G at which the load and hold signals are received to control the first latch 50. When the load signal L is provided at the control input of G (i.e. L is high), the signal at the data input D of the first latch is provided at the Q output of the first latch 50. Upon the load signal L going low, this occurring when the hold signal H goes high, the signal at the Q output is held at its level. The output of the first latch 50 is the intermediate signal I, and acts as a "Done" signal. This signal I is an indication of the completion of the loading of the data Di0-D7 into the latches 56 of the queue register 32.

The intermediate signal I is provided to the data input D of the second latch 52 and to an input of the logic circuit 54. The request-in signal Ri is also received at another input of the logic circuit 54 as is an acknowledge-out signal Ao from the subsequent control cell 34 of the next register stage, or from the two-to-four cycle converter 38 if this control cell is the last control cell 34d.

The second latch 52 has a control input which receives the negative of the load and hold signals produced by the logic circuit 54. When the load signal L goes low, the intermediate signal I at the data input D is loaded into the second latch 52. When the load signal L goes high, and the hold signal H goes low, the intermediate signal I is held at the output Q of the second latch 52. This output signal forms the request-out signal Ro to the subsequent control cell 34, as well as the acknowledge-in signal Ai to the subsequent control cell 34 of the previous stage.

The logic circuit 54 produces the load signal L according to the function $L=\overline{I}AoRi+IAo\overline{Ri}$. The hold signal H is the negative of the load signal L and it is produced at the same time as the load signal L.

The operation of the control cell 34 will now be described using FIG. 4. For this example, assume that initially I, Ri, Ai, Ro, and Ao are all low. This combination causes the signal L produced by the logic circuit 54 to be low. When data is available to be loaded into the queue register 32, the previous control cell 34 sends a request-out signal Ro which is received by the control cell 34 of FIG. 4 as a request-in signal Ri. The transition of the request-in signal Ri to a high level causes the logic circuit 54 to now produce a high load signal L. The presence of a high load signal L at the control input G of the first latch 50 causes the loading of the high request-in signal Ri into the first latch 50. It also causes the loading of the data $D_{i0}-D_{i7}$ into the latches 56 of the queue register 32.

The request-in signal Ri is now present at the Q output of the first latch 50 as the intermediate signal I. The logic circuit 54 receives at its input the intermediate signal I which is now at a high level. The second latch 52 also receives the high intermediate signal I at its data input D. However, this second latch 52 is currently in a hold state since the high load signal L is inverted at the control input G of the second latch 52.

The high intermediate signal I causes the logic circuit 54 to now produce a low load signal L and a high hold signal H. This causes the latches 56 of the queue register 32 to hold at their Q outputs the data $D_{i0}-D_{i7}$ that had been previously loaded. (These data signals are now $D_{(i+1)0}-D_{(i+1)7}$, reflecting their new status as inputs to the next queue register). The high intermediate signal I is then provided at the output Q of the second latch 52. This high intermediate signal I becomes the read-out signal Ro provided to the subsequent control cell or the two-to-four cycle converter 38. It also forms the acknowledge-in signal Ai to the previous control cell 34 or the four-to-two cycle converter 36.

Upon receiving the read-out signal Ro from the control cell 34, a subsequent control cell is able to load the data as described above. After doing so, it will send an acknowledge-in signal Ai back to the logic cell 34 which receives the signal as an acknowledge-out signal Ao at an input of the logic circuit 54.

At this point, data has been shifted once through the queue register 32. The acknowledge-out signal Ao and the intermediate signal I are high, as is the request-in signal Ri. When further data is ready to be loaded into the register 32, the request-in signal Ri transitions to a low level. This causes the logic circuit 54 to change the load signal L once again go to a high level and the hold signal H to a low level. The new data is loaded in the latches 56 of the register 32, and the intermediate signal I is now at a low level, since it assumes the low level of the request-in signal Ri. This transition of the intermediate signal I to a low level causes the logic circuit 54 to lower the level of the load signal L to a low level, and to raise the hold signal H to a high level. The latches 56 hold the data at their Q outputs, and the low intermediate signal I will be provided at the Q output of the second latch 52. The request-out signal Ro is now at a low level, as is the acknowledge-in signal Ai. When the subsequent control cell acknowledges the request-out signal Ro by sending a low-level acknowledge-out signal Ao, the control cell has returned to the initially assumed conditions of Ai, Ri, Ro, Ao and L at low levels. By the above manner of operation, data is loaded and held when the request-in signal Ri either undergoes a low-to-high transition or a high-to-low transition, thereby providing a two-cycle asynchronous FIFO queue.

In comparison to the proposed control cell 18 of the prior art of FIG. 2, the present invention produces the request-out signal Ro at the output Q of the second latch 52. This has a significant impact on the operation of the FIFO queue 30, as now the data will be held in the queue register 32 before the request-out signal is sent to the next control cell. This assures that the next control cell will not attempt to load the data from the queue register 32 before it is held there in a stable condition.

Figure 5:
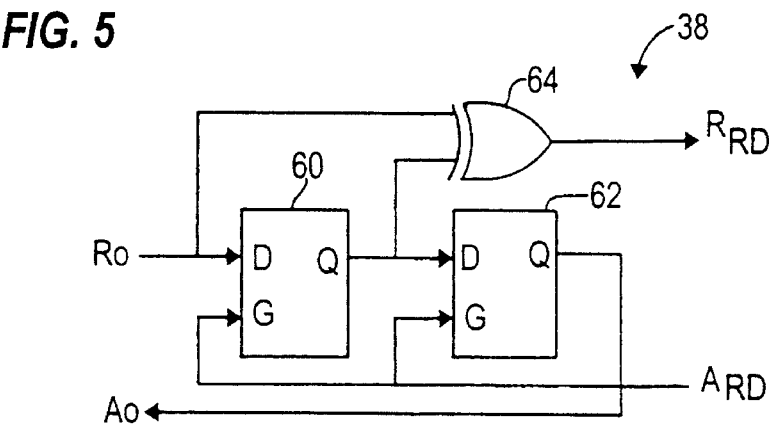
FIG. 5 is a block diagram of a two-to-four cycle converter constructed in accordance with an embodiment of the present invention.

FIG. 5 illustrates in block diagram form a two-to-four cycle converter that converts the read and acknowledge signals from the two-cycle FIFO queue 30 into four-cycle read and acknowledge signals used by other devices.

The two-to-four cycle converter includes first and second latches 60, 62 and an exclusive-OR gate 64. The two-cycle request-out signal Ro is received at the data input D of the first latch 60. It is also provided as one input to the exclusive-OR gate 64. The control input G of the first latch 60 receives the acknowledge-read signal ($A_{RD}$), a four-cycle signal from another device. The request-out signal Ro is provided at the output Q of the first latch, this output being provided as a second input to the exclusive-OR gate 64. The output of the exclusive-OR gate 64 is the four-cycle request read signal $R_{RD}$. The output of the first latch 60 is also provided as an input to the data input D of the second latch 62. The output of the second data latch 62 is the acknowledge-out signal Ao (a two-cycle signal) provided to the last control cell 34d as an input.

Figure 5A:
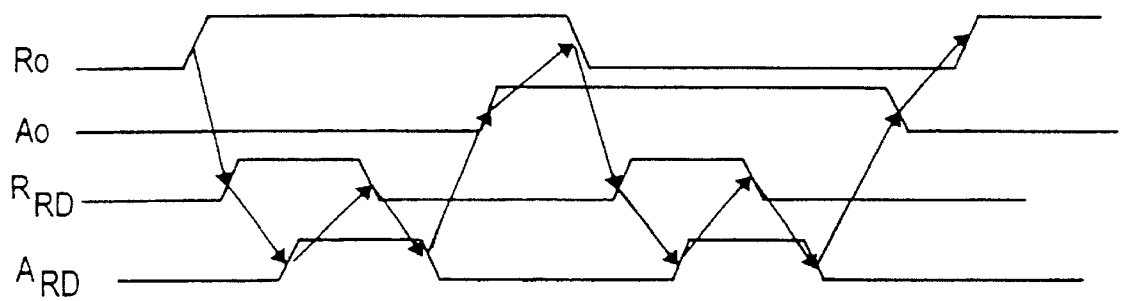
FIG. 5a is a timing diagram of the signals of a two-to-four cycle converter of FIG. 5.

Reference is now made to FIG. 5a, which illustrates the operation of the converter 38. Assume initially that Ro, Ao, $R_{RD}$ and $A_{RD}$ are all at a logic low level. When Ro transitions to a high level, the exclusive-OR gate 64 will have different logic levels at its two inputs. This causes the $R_{RD}$ signal to transition to a high level. In response, the acknowledge-read signal $A_{RD}$ transitions to a high level. This causes the high level Ro signal to be provided at the output Q of the first latch 60. Two high-level signals are present at the inputs of the exclusive-OR gate 64 causing the $R_{RD}$ signal to transition to a low level. This causes the $A_{RD}$ signal to then follow by transitioning to a low level. The second latch 62 receives the low level $A_{RD}$ signal and provides the high level Ro signal at the output queue of the second latch 62. This high level output is the acknowledge-out signal Ao sent to the last control cell 34 to acknowledge the loading of the data at the other device.

At this point, $R_{RD}$, $A_{RD}$ are at a low level, and Ro, Ao are at a high level. When the request-out signal Ro transitions to a low level, there will now be a high level input and a low level input at the exclusive-OR gate 64, causing the $R_{RD}$ signal to transition to a high level. When the $A_{RD}$ signal transitions to a high level in response to the high level of the $R_{RD}$ signal, the low level Ro signal is provided at the output of the first latch 60. This causes the $R_{RD}$ signal to again transition to a low level, causing the $A_{RD}$ signal to transition to a low level. The low level Ro signal is provided at the output of the second latch 62 as the Ao signal which is now at a low level.

In the above-described manner, the two-cycle request-out signal Ro is converted to a four-cycle request-read signal RRD, while a four-cycle acknowledge-read signal ARD is converted to a two-cycle acknowledge-out signal Ao.

The first and second latches 60, 62 may have identical constructions as the latches 50, 52 and 56 of FIG. 4. This provides the advantage of replication in design and manufacture.

Figure 6:
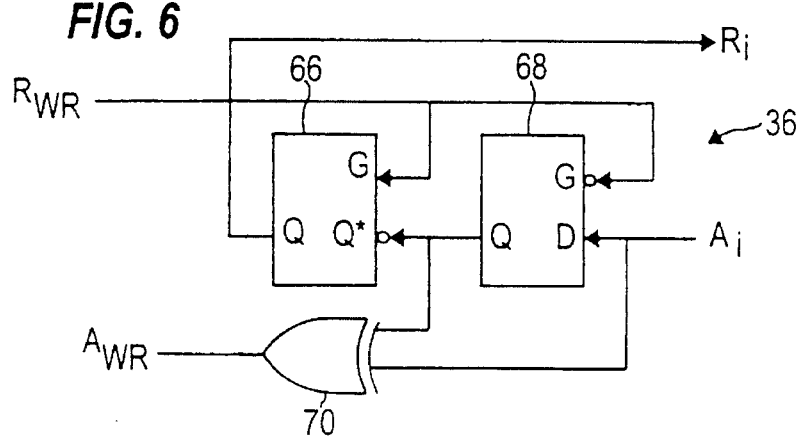
FIG. 6 is a block diagram of a four-to-two cycle converter constructed in accordance with an embodiment of the present invention.
Figure 6A:
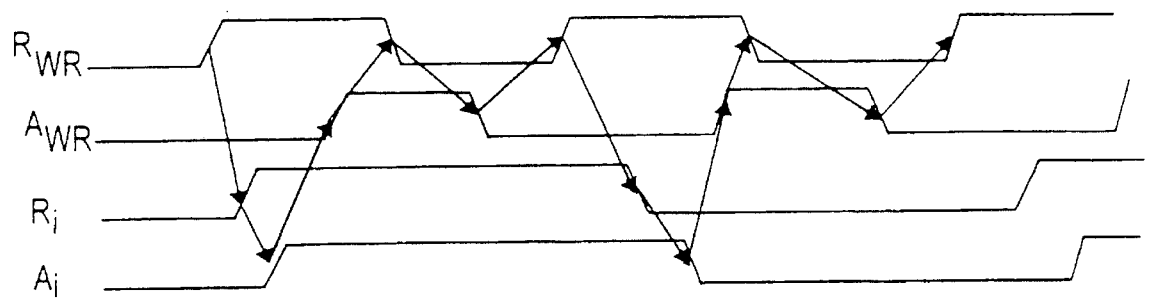
FIG. 6a is a timing diagram of the signals of the four-to-two cycle converter of FIG. 6.

An exemplary embodiment of a four-to-two cycle converter 36 is illustrated in FIG. 6, and the timing diagram for this converter 36 is illustrated in FIG. 6a. The converter 36 includes first and second latches 66, 68 and an exclusive OR gate 70. The four-to-two cycle converter 36 operates in a manner analogous to that already described with respect to the two-to-four cycle converter 38.

Although the present invention has been described and illustrated in detail, it is clearly understood that the same is by way of illustration and example only and is not to be taken by way of limitation, the spirit and scope of the present being limited only by the terms of the appended claims.

What is claimed is:

1. An asynchronous queue arrangement comprising:
   a plurality of queue registers for holding data and which are coupled in series with one another;
   a plurality of control cells coupled in series with one another, each control cell also coupled to a different one of said queue registers and controlling data transfer into and out of said queue register;
   a four-to-two cycle converter coupled to a first one of the series of control cells; and
   a two-to-four cycle converter coupled to a last one of the series of control cells.

2. The arrangement of claim 1, wherein the data is received as an input to the series of queue registers and is available as an output from the queue registers on a first-in/first-out (FIFO) basis.

3. The arrangement of claim 1, wherein each control cell includes first and second latches coupled with one another, the first latch receiving as an input a request-in signal and producing as an output an intermediate signal, the second latch receiving the intermediate signal as an input and producing a request-out signal as an output.

4. The arrangement of claim 3, wherein each control cell further includes a logic circuit coupled to the queue register and to the first and second latches, the logic circuit, in response to input signals, supplying a load signal and a hold signal to the queue register and to the first and second latches.

5. The arrangement of claim 4, wherein the first latch has a first input at which the request-in signal is received, an output and a second input at which the latch signal and the hold signal are received, the first latch loading the request-in signal and providing the request-in signal as the intermediate signal at the output of the first latch upon receipt of the load signal at the second input of the first latch, and holding the intermediate signal at the output of the first latch upon receipt of the hold signal at the second input of the first latch.

6. The arrangement of claim 5, wherein the second latch has a first input at which the intermediate signal is received, an output and a second input at which complements of the load signal and the hold signal are received, the second latch loading the intermediate signal and providing the intermediate signal as the request-out signal at the output of the second latch upon receipt of the complement of the load signal at the second input of the second latch, and holding the request-out signal at the output of the second latch upon receipt of the complement of the hold signal at the second input of the second latch.

7. The arrangement of claim 6, wherein the logic circuit receives as logic circuit input signals the request-in signal, the intermediate signal, and an acknowledge-out signal, the logic circuit producing the load signal and the hold signal as a function of said logic circuit input signals.

8. The arrangement of claim 7, wherein the load signal is produced according to the function $L = \bar{I}.Ri.\overline{Ao} + I.\overline{Ri}.Ao$, where L is the load signal, I is the intermediate signal, Ri is the request-in signal, and Ao is the acknowledge-out signal, and wherein the hold signal H is the complement of the load signal L such that $H = \bar{L}$.

9. The arrangement of claim 1, wherein each control cell includes first and second latches, and each queue register includes a plurality of latches, the first and second latches being identical to each other and to each of the plurality of latches of each queue register.

10. The arrangement of claim 1, wherein the four-to-two cycle converter includes first and second latches, each of the first and second latches having a first input, a control input, and an output at which a signal present at the first input is available in response to a control signal at the first input, the first latch having as its first input an acknowledge-in signal, its control input receiving a complement of a request-write signal as the control signal, and producing an intermediate signal at its output, the second latch having its first input receiving a complement of the intermediate signal, its control input receiving the request-write signal as the control signal, and producing a request-in signal at its output, the request-write signal being a four-cycle signal and the request-in signal and the acknowledge-in signal being two-cycle signals.

11. The arrangement of claim 10, wherein the four-to-two cycle converter further includes an exclusive-OR gate having a first input that receives the acknowledge-in signal, a second input that receives the intermediate signal, and an output at which an acknowledge-write signal is provided, the acknowledge-write signal being a four-cycle signal.

12. The arrangement of claim 1, wherein the two-to-four cycle converter includes first and second latches, each of the first and second latches having a first input, a control input, and an output at which a signal present at the first input is available in response to a control signal at the first input, the first latch having its first input receiving an request-out signal, its control input receiving an acknowledge-read as the control signal, and producing an intermediate signal at its output, the second latch having its first input receiving the intermediate signal, its control input receiving a complement of the acknowledge-read signal as the control signal, and producing an acknowledge-out signal at its output, the acknowledge-read signal being a four-cycle signal and the request-out signal and the acknowledge-out signal being two-cycle signals.

13. The arrangement of claim 12, wherein the two-to-four cycle converter further includes an exclusive-OR gate having a first input that receives the read-out signal, a second input that receives the intermediate signal, and an output at which a request-read signal is provided, the request-read signal being a four-cycle signal.

14. The arrangement of claim 1, further comprising a full/empty indicator circuit coupled to the plurality of control cells, the indicator circuit providing an indication of whether the individual queue registers contain data.

15. The arrangement of claim 14, wherein the indicator circuit includes a plurality of logic gates coupled to different ones of the control cells, each logic gate having a first input coupled to an output of one of the control cells, and a second input coupled to an input of one of the control cells.

16. The arrangement of claim 15, wherein each logic gate is an exclusive-OR gate, and the output of the control cell is a request signal, and the input of the control cell is an acknowledge signal, the exclusive-OR gate having an output at which a full signal is produced in response to the request signal and the acknowledge signal concurrently having different logic levels.

17. An asynchronous first-in/first-out (FIFO) device comprising:

a queue register for holding data; and a control cell coupled to the queue register and controlling data transfer into and out of said queue register;

wherein the control cell includes: first and second latches coupled with one another, the first latch receiving a request-in signal and in response producing an intermediate signal, the second latch receiving the intermediate signal and in response producing a request-out signal; a logic circuit coupled to the queue register and to the first and second latches, the logic circuit producing in response to input signals a load signal and a hold signal to the queue register and to the first and second latches, the load signal causing the queue register to load data and the hold signal causing the queue register to hold said data.

18. The device of claim 17, wherein the logic circuit includes a first input at which an acknowledge-out signal is received as one of the input signals, the acknowledge-out signal indicating whether the data held in the queue register has been received by another device.

19. The device of claim 18, wherein the logic circuit has a second input at which a request-in signal is received as another one of said input signals, the request-in signal indicating whether there is data available to be loaded into the queue register, the logic circuit producing the load signal upon the request-in signal indicating that there is data available after receiving the acknowledge-out signal indicating that the data held in the queue register was received by said another device.

20. The device of claim 19, wherein the acknowledge-out signal indicates that the data held in the queue register was received by another said device only after the request-out signal is produced at the output of the second latch, the request-out signal indicating to said another device the availability of the data held in the queue register.

21. The device of claim 20, wherein the logic circuit has a third input at which the intermediate signal is received, the intermediate signal indicating whether the data has been loaded into the queue register, the logic circuit producing the hold signal in response to receipt of the intermediate signal indicating that the data has been loaded into the queue register.

22. The device of claim 17, wherein the first latch has a first input at which the request-in signal is received, an output and a second input at which the load signal and the hold signal are received, the first latch loading the request-in signal and providing the request-in signal as the intermediate signal at the output of the first latch upon receipt of the load signal at the second input of the first latch, and holding the intermediate signal at the output of the first latch upon receipt of the hold signal at the second input of the first latch.

23. The device of claim 22, wherein the second latch has a first input at which the intermediate signal is received, an output and a second input at which complements of the load signal and the hold signal are received, the second latch loading the intermediate signal and providing the intermediate signal as the request-out signal at the output of the second latch upon receipt of the complement of the load signal at the second input of the second latch, and holding the request-out signal at the output of the second latch upon receipt of the complement of the hold signal at the second input of the second latch.

24. The device of claim 23, wherein the logic circuit receives as logic circuit input signals the request-in signal, the intermediate signal, and an acknowledge-out signal, the logic circuit producing the load signal and the hold signal as a function of said logic circuit input signals.

25. The device of claim 24, wherein the load signal is produced according to the function $L = \overline{I}.Ri.\overline{Ao} + I.\overline{Ri}.Ao$, where L is the latch signal, I is the intermediate signal, Ri is the request-in signal, and Ao is the acknowledge-out signal, and wherein the hold signal H is the complement of the latch signal L such that $H = \overline{L}$.

26. The device of claim 1, wherein the queue register includes a plurality of latches, the first and second latches being identical to each other and to the plurality of latches of each queue register.

27. A control cell for controlling a queue register of an asynchronous first-in/first-out (FIFO) device comprising:

a control cell receiving a request-in signal and an acknowledge-out signal, and providing as outputs an acknowledge-in signal, a request-out signal, and control signals for controlling a queue register;

first and second latches coupled with one another, the first latch receiving at a first latch input said request-in signal and producing at a first latch output an intermediate signal, the second latch receiving the intermediate signal at a second latch input and producing said request-out signal at a second latch output, each of the first and second latches having a control input; and a logic circuit having a logic circuit output at which the control signal is provided, said logic circuit output coupled to the control inputs of the first and second latches, the logic circuit producing, at the logic circuit output in response to input signals, the control signals that cause a queue register to load data and to hold data and that control the production of signals at the first latch output and the second latch output.

28. The control cell of claim 27, wherein the logic circuit includes a first input at which the acknowledge-out signal is received as one of the input signals, the acknowledge-out signal indicating whether the data held in a queue register has been received by another device.

29. The control cell of claim 28, wherein the logic circuit has a second input at which the request-in signal is received as another one of said input signals, the request-in signal indicating whether there is data available to be loaded into a queue register, the control signals including a load signal and a hold signal, the logic circuit producing the load signal upon the request-in signal indicating that there is data available after receiving the acknowledge-out signal indicating that the data held in a queue register was received by said another device.

30. The control cell of claim 29, wherein the acknowledge-out signal indicates that the data held in a queue register was received by another said device only after the request-out signal is produced at the output of the second latch, the request-out signal indicating to said another device the availability of the data held in a queue register.

31. The control cell of claim 30, wherein the logic circuit has a third input at which the intermediate signal is received, the intermediate signal indicating whether the data has been loaded into a queue register, the logic circuit producing the hold signal in response to receipt of the intermediate signal indicating that the data has been loaded into a queue register.

32. The control cell of claim 27, wherein the first latch has a first input at which the request-in signal is received, an output and a second input at which the control signals are received, the control signals including a load signal and a hold signal, the first latch loading the request-in signal and providing the request-in signal as the intermediate signal at the output of the first latch upon receipt of the load signal at the second input of the first latch, and holding the intermediate signal at the first latch output upon receipt of the hold signal at the second input of the first latch.

33. The control cell of claim 32, wherein the second latch has a first input at which the intermediate signal is received, an output and a second input at which complements of the load signal and the hold signal are received, the second latch loading the intermediate signal and providing the intermediate signal as the request-out signal at the second latch output upon receipt of the complement of the load signal at the second input of the second latch, and holding the request-out signal at the output of the second latch upon receipt of the complement of the hold signal at the second input of the second latch.

34. The control cell of claim 33, wherein the logic circuit receives as logic circuit input signals the request-in signal, the intermediate signal, and the acknowledge-out signal, the logic circuit producing the control signals as a function of said logic circuit input signals.

35. The control cell of claim 34, wherein the load signal is produced according to the function $L=\bar{I}.Ri.\overline{Ao}+I.\overline{Ri}.Ao$, where L is the latch signal, I is the intermediate signal, Ri is the request-in signal, and Ao is the acknowledge-out signal, and wherein the hold signal H is the complement of the latch signal L such that $H=\bar{L}$.

36. The control cell of claim 27, wherein the first and second latches are identical to each other.

* * * * *